(No Model.)
W. COLE.
SAND BAND FOR VEHICLES.
No. 287,364. Patented Oct. 23, 1883.
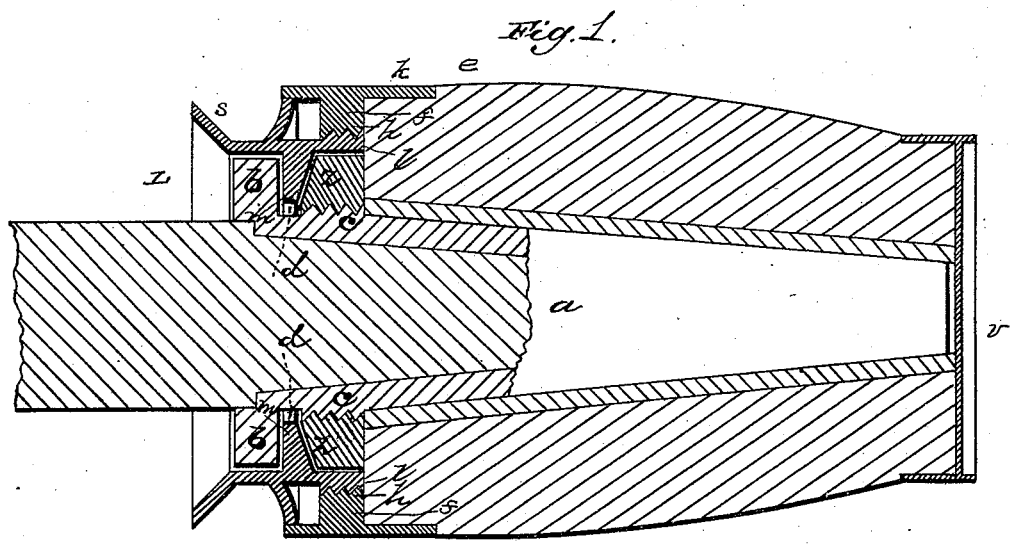
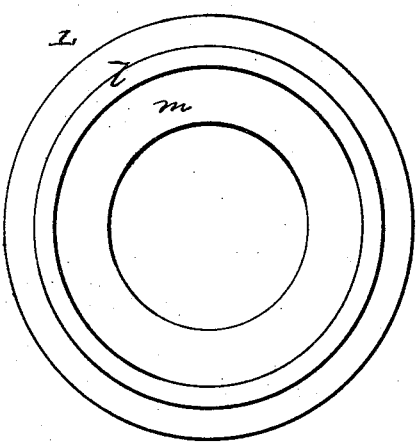
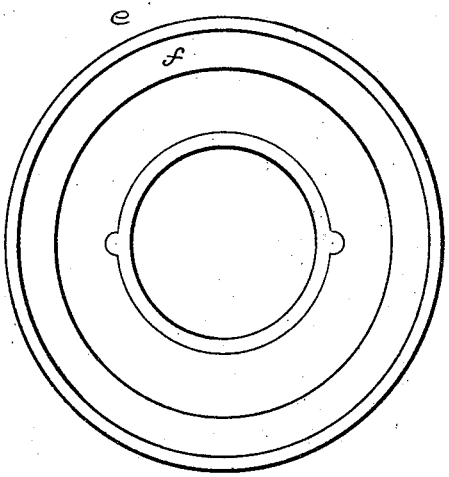
WITNESSES
E. H. Bates.
Philip C. Masi.
INVENTOR
Wesley Cole
by Anderson & Smith
his ATTORNEYS

UNITED STATES PATENT OFFICE.

WESLEY COLE, OF MENOMONEE, WISCONSIN, ASSIGNOR OF ONE-HALF TO A. G. ANDERSON AND SEWELL A. PETERSON, BOTH OF SAME PLACE.

SAND-BAND FOR VEHICLES.

SPECIFICATION forming part of Letters Patent No. 287,864, dated October 23, 1883.

Application filed April 3, 1883. (No model.)

*To all whom it may concern:*

Be it known that I, WESLEY COLE, a citizen of the United States, residing at Menomonee, in the county of Dunn and State of Wisconsin, have invented certain new and useful Improvements in Sand-Bands; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view. Fig. 2 is a face view of the sand-band. Fig. 3 is a rear view of the hub.

This invention has relation to improvements in combined sand-bands and means for attaching hubs to axles or axle-spindles; and it consists in the construction and novel arrangement of parts, as will be hereinafter more fully set forth and claimed.

In the accompanying drawings, the letter $a$ designates the spindle, which is formed with the shoulder $b$, the threaded portion $c$, near the shoulder, and the smooth bearing $d$, between the threaded portion and said shoulder. The hub $e$, which engages the spindle, is formed with a circular recess in its inner end, which is provided with an internal thread, as indicated at $h$. This thread may be formed on the inner wall of an annular interior flange, $f$, of the inner band, $k$, of the hub.

L represents the annular sand-band section, which is designed to be attached to the hub. This section is provided on its outer face with a circumferential concavity, at the ends of which are formed oppositely-diverging lip-flanges $s$ and $a'$, the flange $a'$ extending within and abutting against the inside of the inward extension of the wheel-hub band $k$, and is formed with an interior flange-bearing, $m$, designed to turn on the bearing $d$ of the spindle. The sand-band flange $s$ is designed to project over the shoulder of the spindle, and the externally-threaded lip $l$ is designed to engage the internally-threaded portion $h$ of the hub. A collar, $z$, which is internally threaded to engage the threaded portion $c$ of the spindle, is applied thereon, within the lip $l$ of the sand-band section L, after the latter has been placed on the spindle. Then the body of the hub is put on the spindle, and the sand-band section is fastened to the hub by its threaded lip. The sand-band section protects the spindle at the inner end from the access of dust or sand, and at the outer end of the spindle the hub may be provided with a close cap-band, as indicated at $v$.

Having described this invention, what I claim, and desire to secure by Letters Patent, is—

The sand-band section L, provided on its outer face with an annular concavity and oppositely-diverging lip-flanges $s$ and $a'$, the lip $a'$ of which engages with the inside of the inner extension of the hub-band $k$, the internal vertically-annular flange, $m$, inclined upon its outer face, and the externally-threaded lip $l$, all made integral, and adapted to operate in combination with the threaded and shouldered spindle, wheel-hub, and threaded collar, substantially as specified.

In testimony whereof I affix my signature in presence of two witnesses.

WESLEY COLE.

Witnesses:
W. J. COWAN,
THOMAS RUNNING.